United States Patent [19]

(12) United States Patent
Ley et al.

(10) Patent No.: US 7,725,391 B1
(45) Date of Patent: May 25, 2010

(54) SAVINGS SYSTEM BASED ON TIME OF TRANSACTION

(75) Inventors: Michael Ley, Moon Township, PA (US); Bryan L. Mackrell, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 12/239,888

(22) Filed: Sep. 29, 2008

(51) Int. Cl.
*G06Q 40/00* (2006.01)
(52) U.S. Cl. .................................... 705/39; 705/30
(58) Field of Classification Search ............... 705/10–44
See application file for complete search history.

(56) References Cited

U.S. PATENT DOCUMENTS

| 6,112,191 A | 8/2000 | Burke |
| 6,164,533 A | 12/2000 | Barton |
| 6,216,115 B1 * | 4/2001 | Barrameda et al. ............ 705/40 |
| 6,631,358 B1 * | 10/2003 | Ogilvie ........................ 705/39 |
| 2006/0047589 A1 * | 3/2006 | Grau ........................... 705/35 |
| 2007/0033134 A1 * | 2/2007 | Carretta et al. ................ 705/38 |
| 2009/0063332 A1 * | 3/2009 | Tabaczynski et al. ......... 705/39 |

FOREIGN PATENT DOCUMENTS

WO   WO 9404979 A1 *   3/1994

* cited by examiner

*Primary Examiner*—Frantzy Poinvil
(74) *Attorney, Agent, or Firm*—Cohen & Grigsby, P.C.

(57) ABSTRACT

A computer-assisted method for an automatic savings plan. The method includes calculating a savings amount from an indication of a time of transaction for each of a plurality of transactions. The method also includes transferring the savings amount from a first account to at least one receiving account.

36 Claims, 8 Drawing Sheets

| Benefits | Accessing Accounts | Paying Bills | Making Transfers | Customer Service |
|---|---|---|---|---|
| Signing On | Setting Up | Account Summary | Account Activity | Wealth Management |

Online Banking & Bill Pay

Online Banking — 36

| My Accounts | My Profile | Transfer Funds | Bill Center | Message Center | My Offers |

Sign Off

Account Detail — 38

View All Accounts | Edit Account Nickname | Help?

Regular Checking XXXXXX1234 ▽    Available Balance $843.36

Summary | Pending Transactions | Posted Transactions | Online Statements | Auto Alerts Detail by Date | Detail by Type | Search Transactions All Deposits Checks and Deductions ▽                                                                    [Export]

| Date | Description | Withdrawls | Deposits | Balance |
|---|---|---|---|---|
| 06/20/2007 | CHECK CARD PURCHASE XXXXXX1234 GAS STATION | $20.00 | | $863.36 |
| 06/20/2007 | ONLINE TRANSFER FROM XXXXXX6789 | | $500.00 | $363.36 |
| 06/19/2007 | POS PURCHASE POSXXXXXX1234 PHARMACY | $24.23 | | $387.59 |
| 06/16/2007 | CHECK CARD PURCHASE XXXXXX1234 CONVENIENT STORE | $22.75 | | $410.34 |
| 06/16/2007 | ACH WEBSINGLE CKFXXXXXX9999POS ELECTRIC COMPANY ONLINE | $158.63 | | $568.97 |
| 06/12/2007 | CHECK CARD PURCHASE XXXXXX1234 DEPARTMENT STORE | $87.40 | | $656.37 |

40
42

Online Statements
Account Nicknames
Images & Copies
Stop Payment
Reorder Checks
Check/ATM Cards
Campus ID Card
Gift Cards

[Sign Off]

Did You Know?
You Can Get Special
Discounts When You
Pay With Your
Check Card.

New to online banking?
△ Get Started Now!

FIG. 5

SAVINGS SYSTEM BASED ON TIME OF TRANSACTION

BACKGROUND

In recent years personal savings rates have continued to decline and the amount of debt has continued to rise in the United States. Many customers of financial institutions have one primary bank account from which they conduct all of their financial transactions, including paying bills, discretionary spending, saving, etc. The abundant availability of ATMs and credit and debit cards makes consumer spending convenient, resulting in easy depletion of funds available for other expenses and leaving no funds available for savings. As mobile networks and on-line banking continue to expand, financial customers want easy, identifiable transactions as well as immediate access to available funds. To meet this demand and to encourage personal savings by their customers, financial institutions are constantly improving their electronic and online banking services. Still, there is a need for simplified and effective methods of saving for customers using one primary account or a small number of accounts for all their financial transactions.

SUMMARY

In one general aspect, embodiments of the present invention pertain to a system and method for automatic personal savings based on the time at which transactions occur within a bank account. Embodiments of the present invention allow a bank customer to allocate a savings amount equal to an aggregated amount of savings. The aggregated amount of savings is a sum of monetary amounts that are individually based on the time stamps of each of certain designated transactions within an account during a specified time period, for example daily, weekly, monthly, quarterly, or yearly. The savings amount is transferred to at least one designated receiving account. The receiving account may be, for example without limitation, a money folder within the account, a separate bank account such as the customer's savings account or investment account, another party's account, or multiple folders and accounts.

In one embodiment, the present invention is directed to a computer-assisted method for an automatic savings plan. The method includes calculating a savings amount from an indication of a time of transaction for each of a plurality of transactions, and transferring the savings amount from a first account to at least one receiving account.

Those and other details, objects, and advantages of the present invention will become better understood or apparent from the following description and drawings showing embodiments thereof.

BRIEF DESCRIPTION OF THE DRAWINGS

Various embodiments of the present invention are described herein by way of example in conjunction with the following figures, wherein:

FIG. 5. illustrates a screen shot of an online or electronic banking interface in which embodiments related to processing and aggregating a monetary amount based on the time stamps of a plurality of transactions for an automatic savings plan of the present invention may be used;

DESCRIPTION

In general, various embodiments of the present invention are directed to systems and methods relating to an automatic savings plan that uses an account, such as a debit (e.g., a checking account) or credit account, offered to customers by financial services entities as a savings tool. The systems and methods, in various embodiments, aggregate monetary amounts that are based on the transaction time, as recorded with a time stamp, of a plurality of transactions over a specified period of time. After the specified period of time, the aggregated amount is deducted from the account and transferred to at least one receiving account. Although various embodiments are illustrated herein as being implemented and used in an online or electronic banking environment, it can be understood that the systems and methods described herein may be used in any type of banking environment.

Figure 1:
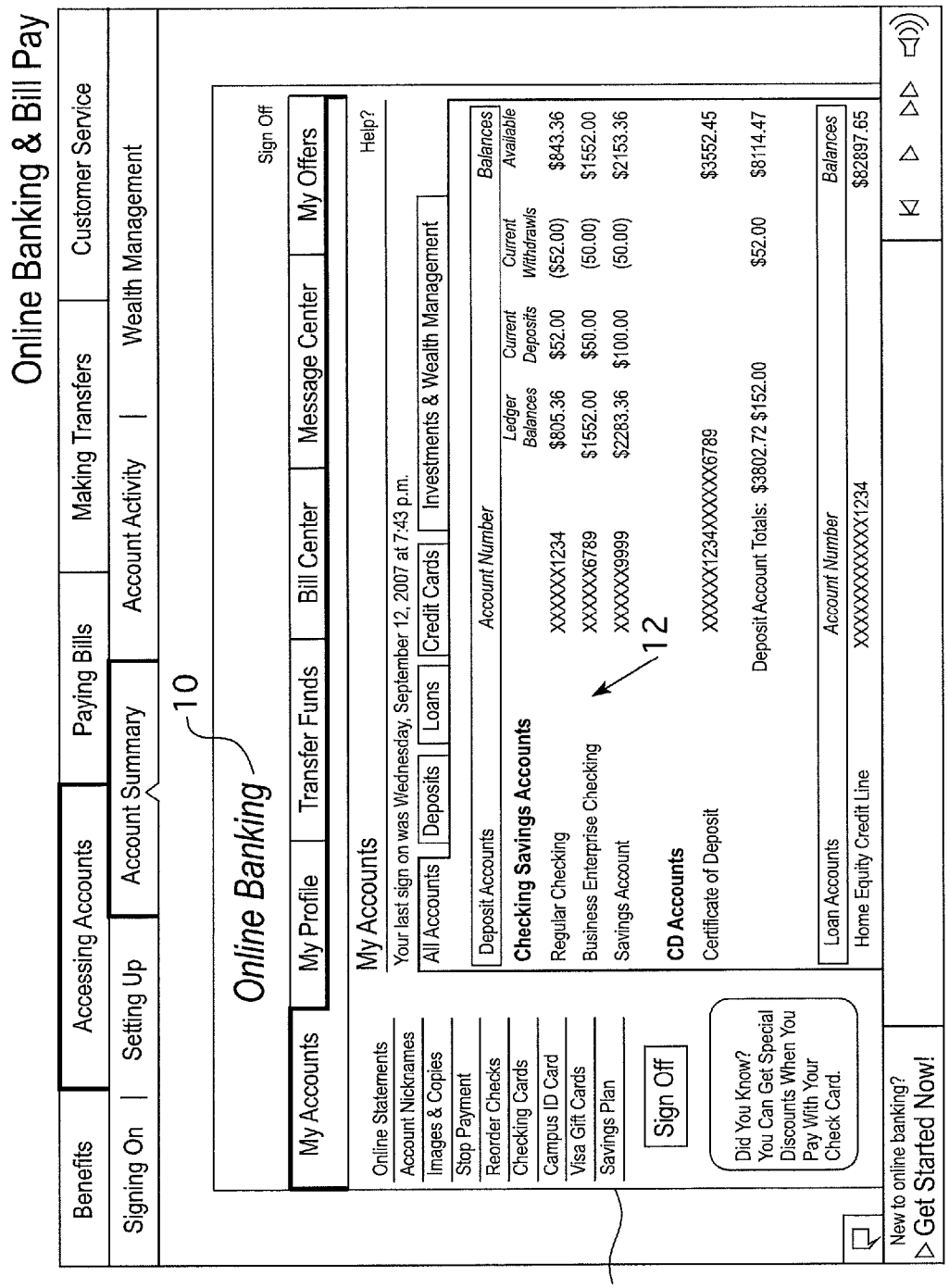
FIG. 1 illustrates a screen shot of an online or electronic banking interface in which embodiments of the present invention may be used.

FIG. 1 illustrates a screen shot of an online or electronic banking interface 10 in which embodiments of the present invention may be used. As can be seen, a customer has access to an account 12, such as a debit (e.g., checking account) or credit account, which is identified by an account number. As an example, to enroll in the savings plan the customer would click on an icon 14 for the savings plan. In various embodiments, the customer may enroll in the savings plan using a telephone, in person, by mail, by email, by text or instant message, etc.

Figure 2:
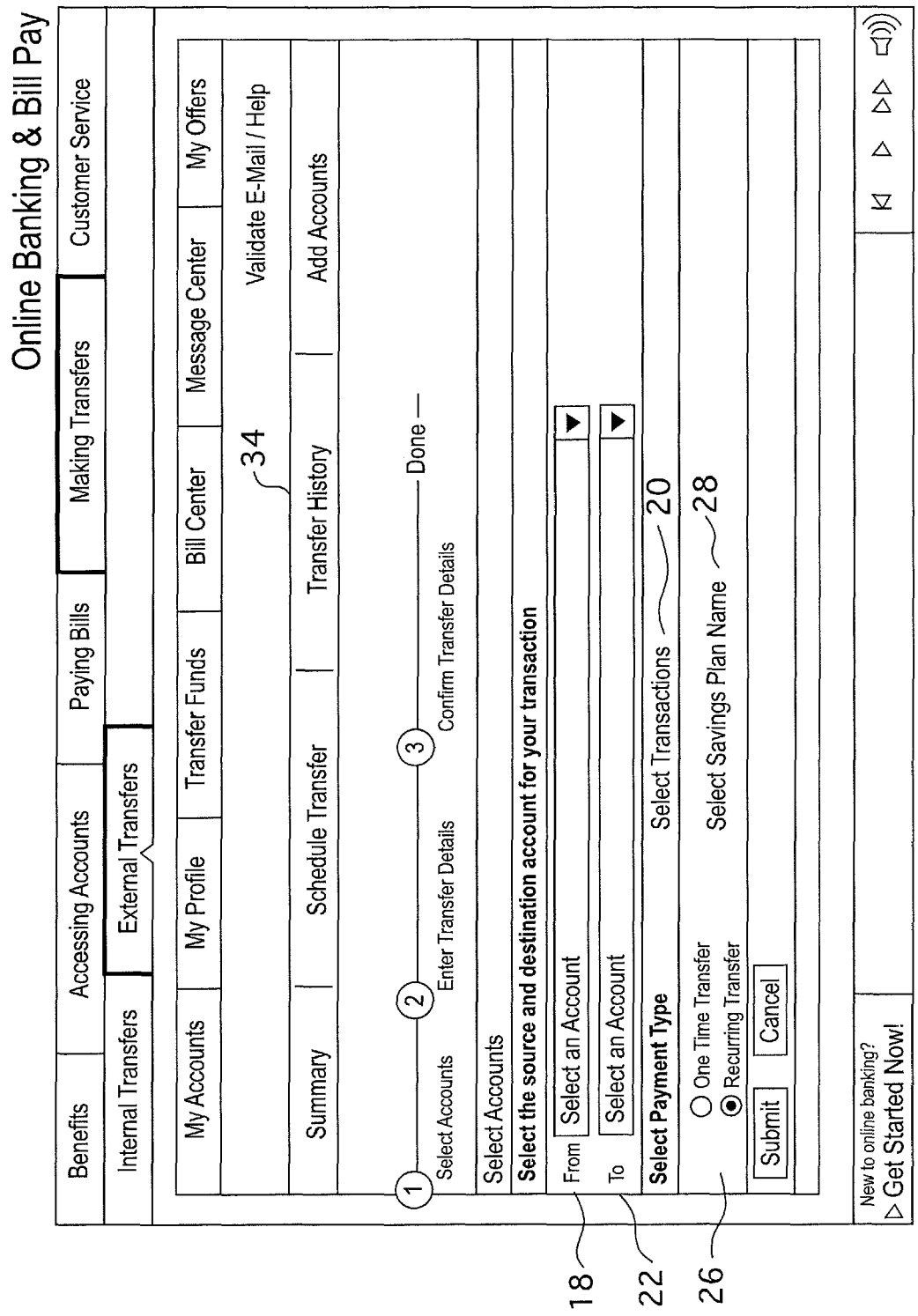
FIG. 2 illustrates a screen shot of an online or electronic banking interface in which embodiments related to enrolling in a savings plan of the present invention may be used.
Figure 3:
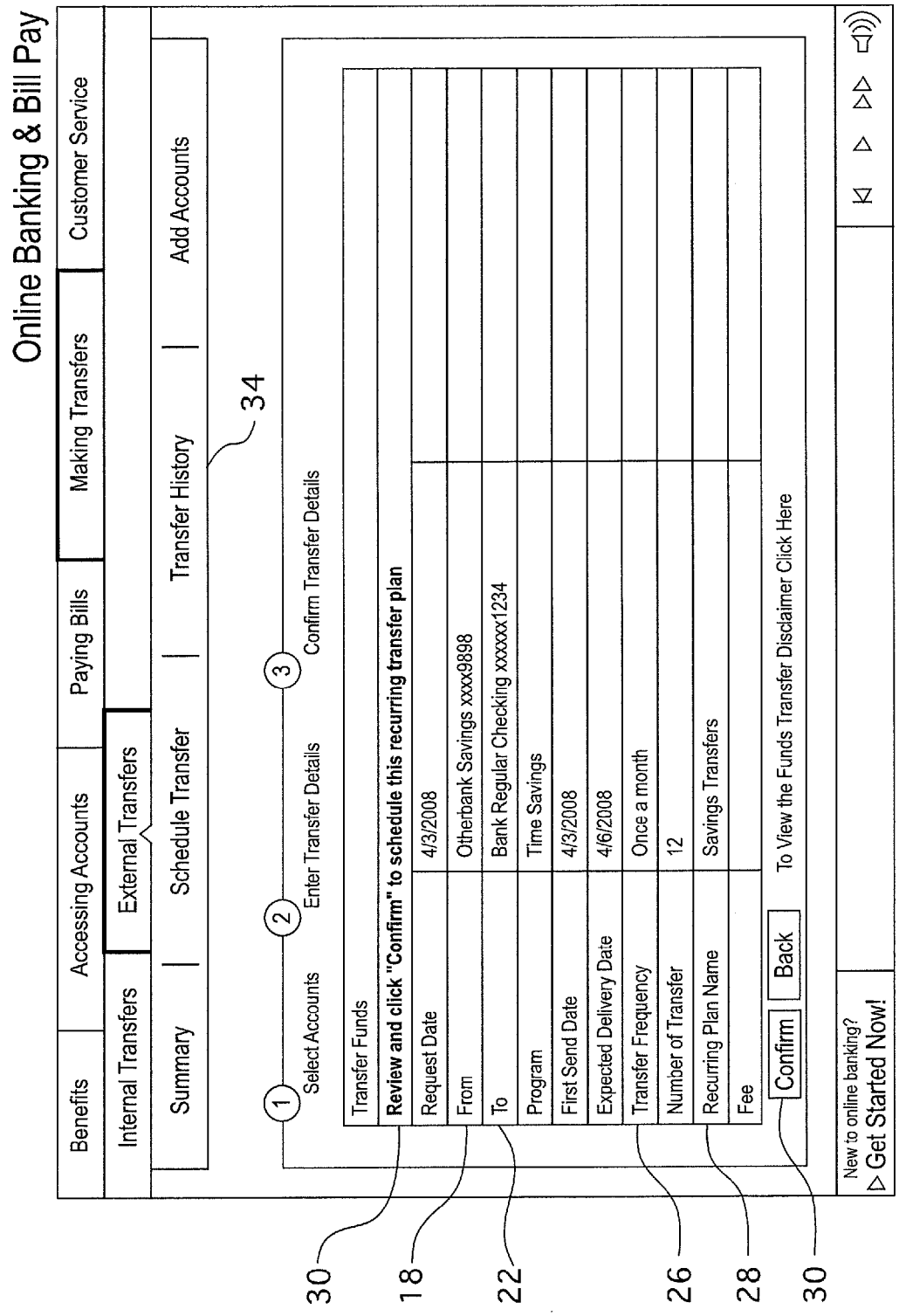
FIG. 3 illustrates a screen shot of an online or electronic banking interface in which embodiments related to confirming a savings plan of the present invention may be used.
Figure 4:
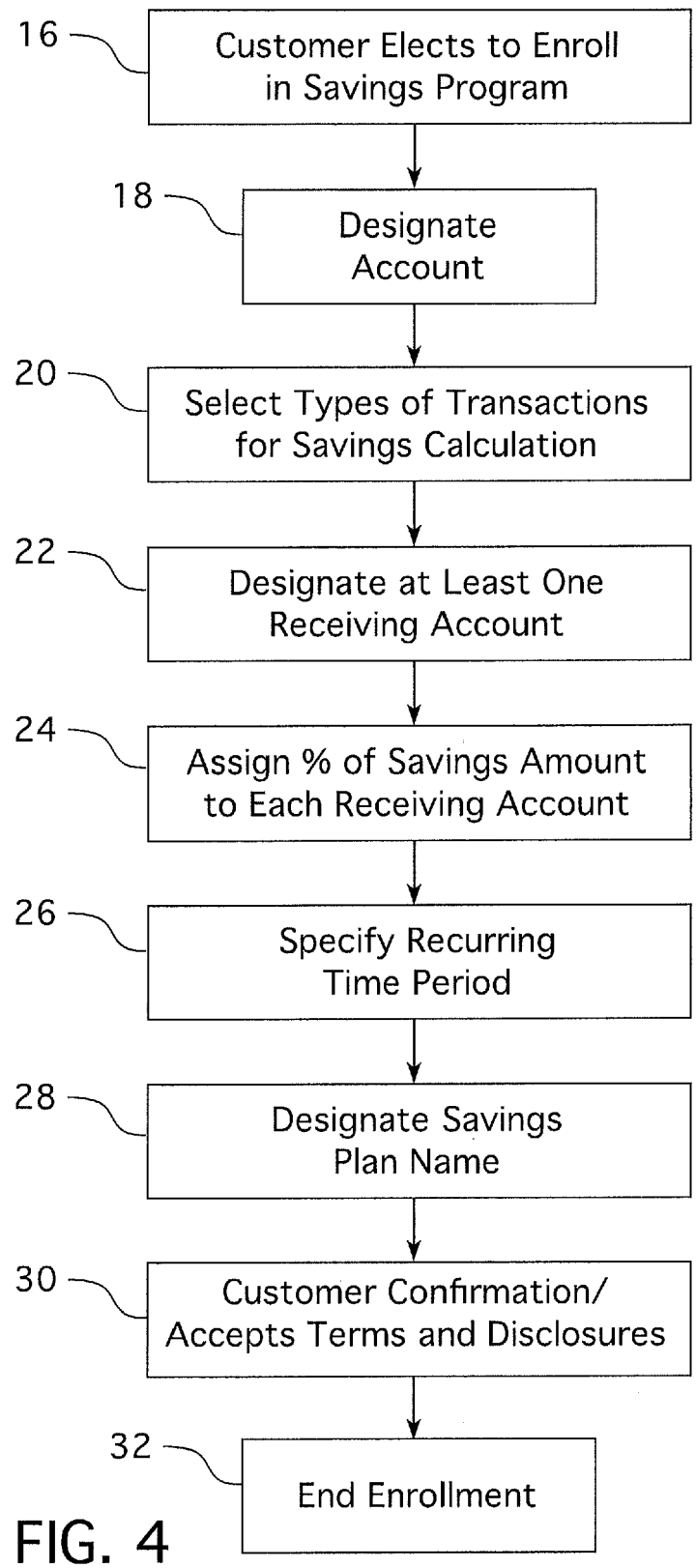
FIG. 4 illustrates a flowchart of an embodiment of a method for enrolling a customer in an automatic savings plan within an account.

FIG. 2 and FIG. 3 illustrate example screen shots of online or electronic banking interfaces for completing enrollment in the savings plan. FIG. 4 illustrates a flowchart of an embodiment of a method for enrolling a customer in an automatic savings plan within a debit account, such as a checking account. The customer elects to enroll in the savings program at 16, for example by clicking on the icon 14, by telephone, in person, by mail, by email, by text or instant message, etc., for the savings program. The customer designates the account 12 to be used for the automatic savings program at step 18. At step 20, the customer selects at least one type of transaction, for example check card, paper check, bill pay, credit transaction, point of service purchases, etc., to be used by the savings program for calculating a savings amount.

The customer designates at least one receiving account to receive the aggregated savings amount at step 22. For example, the receiving account may be a savings account, investment account, another party's account, a subfolder within the account, multiple accounts, etc. If more than one receiving account is designated, the customer assigns a percentage of the savings amount to each account at step 24. For example, if two receiving accounts are designated, then the customer could assign each account 50% of the savings amount. At step 26, the customer specifies a recurring time period, such as daily, weekly, monthly, quarterly, yearly, etc. for aggregating the savings amount of the transactions. In one embodiment, the customer designates a name at step 28, for example without limitation, "savings plan transfer," "time-based savings program transfer," "transfer from grandma," etc., for a transfer transaction of the savings program between the account 12 and the receiving account. In one embodiment, the customer confirms the designations for the automatic savings program and accepts any terms and disclosures for the savings plan at step 30. Enrollment ends at step 32. In one embodiment, the customer may view the transfer history by clicking or selecting icon 34 as illustrated in FIGS. 2 and 3.

FIG. 5 illustrates a screen shot of an online or electronic banking interface 36 in which embodiments of the present invention related to processing and aggregating a monetary amount based on the time stamps of a plurality of transactions may be used. As can be seen, transactions are posted to an account 38, such as a debit account or a credit account. The time stamp from each transaction is examined and a savings amount for each transaction is calculated based on the time stamp. In one embodiment, the minute portion of the time stamp (i.e., 01 through 59) or the hour portion of the time stamp (i.e., 01 through 12 or 01 through 24) may be used as a cent amount that constitutes the savings amount for a particular transaction. In one embodiment, the minute portion of the time stamp or the hour portion of the time stamp may be multiplied by any numerical multiplier or increased by a constant amount to form the savings amount for a particular transaction. In one embodiment, the hour and minute portions of the time stamp may both be used to calculate the savings amount for a particular transaction. For example, the hour and minute portions may be added together to arrive at a monetary amount, the four digits (i.e., 2 for the hour portion and 2 for the minute portion) of the hour and minute portions of the time stamp may be added together to arrive at a monetary amount. The savings amounts for each transaction are aggregated to result in an aggregated savings amount.

Figure 6:
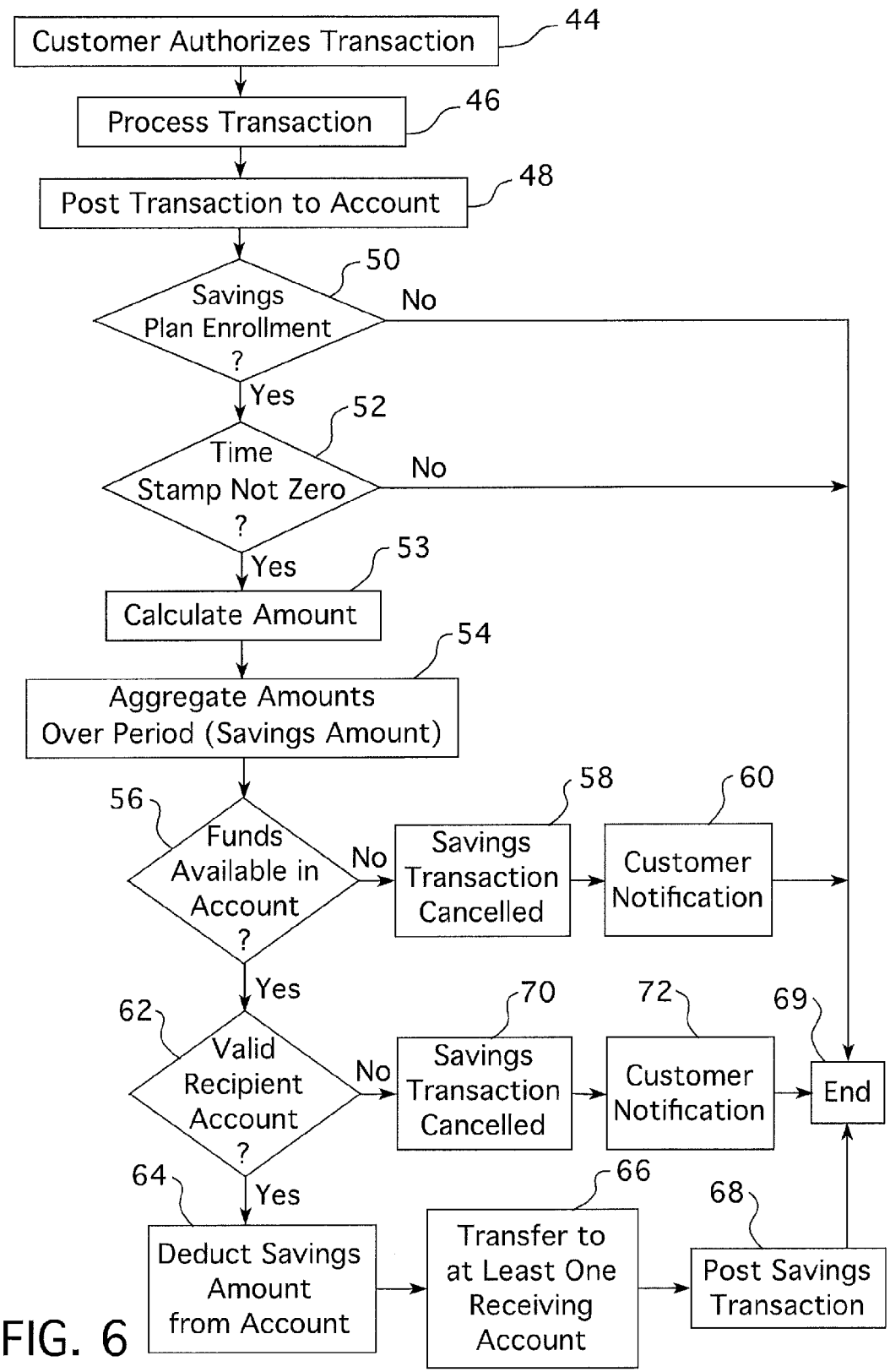
FIG. 6 illustrates a flowchart of an embodiment of a method for processing and aggregating a monetary amount based on the transaction time (e.g., time stamps) of a plurality of transactions and transferring the aggregated savings amount to at least one receiving account.

FIG. 6 illustrates a flowchart of an embodiment of a method for processing and aggregating a monetary amount based on the transaction time (e.g, time stamps) of a plurality of transactions and transferring the aggregated savings amount to at least one receiving account. After a transaction is authorized at 44, processed at 46, and posted to the account at 48, customer enrollment in the automatic savings program is determined at step 50. If the customer is not enrolled, then normal processing continues and ends at 69. If the customer is enrolled in the automatic savings plan, then the type of transaction must be considered at step 50. If the transaction is eligible for consideration by the savings plan, the time stamp of the transaction is examined at step 52. A monetary amount is calculated based on the time stamp at step 53 and the amount is added at step 54 to an aggregated savings amount. Steps 44 through 54 continue for each transaction over the specified period of time, such as weekly, for example, to calculate the total aggregated savings amount.

After the savings amount is calculated for the specified period of time, the amount of funds available in the funding account is determined at step 56 to ensure there are enough funds available to deduct the aggregated savings amount from the account. If there are not enough funds in the funding account to complete the transaction, the savings program transaction is cancelled at step 58 and the customer notified at step 60. The receiving account is checked for validity at step 62. If the receiving account is valid, then the savings amount is deducted from the funding account, in the case of a debit account, or is charged against a credit account, at step 64. The savings amount is transferred at step 66 to the receiving account(s) as designated during enrollment and the savings plan transaction is posted to both the funding account and the receiving account at step 68. The program is completed for the specified time period at 69. If the recipient account is invalid, the transaction is cancelled 70. A notice is sent to the customer to terminate or update the enrollment for the savings plan at step 72 and processing ends at 69 until further input from the customer.

Figure 7:
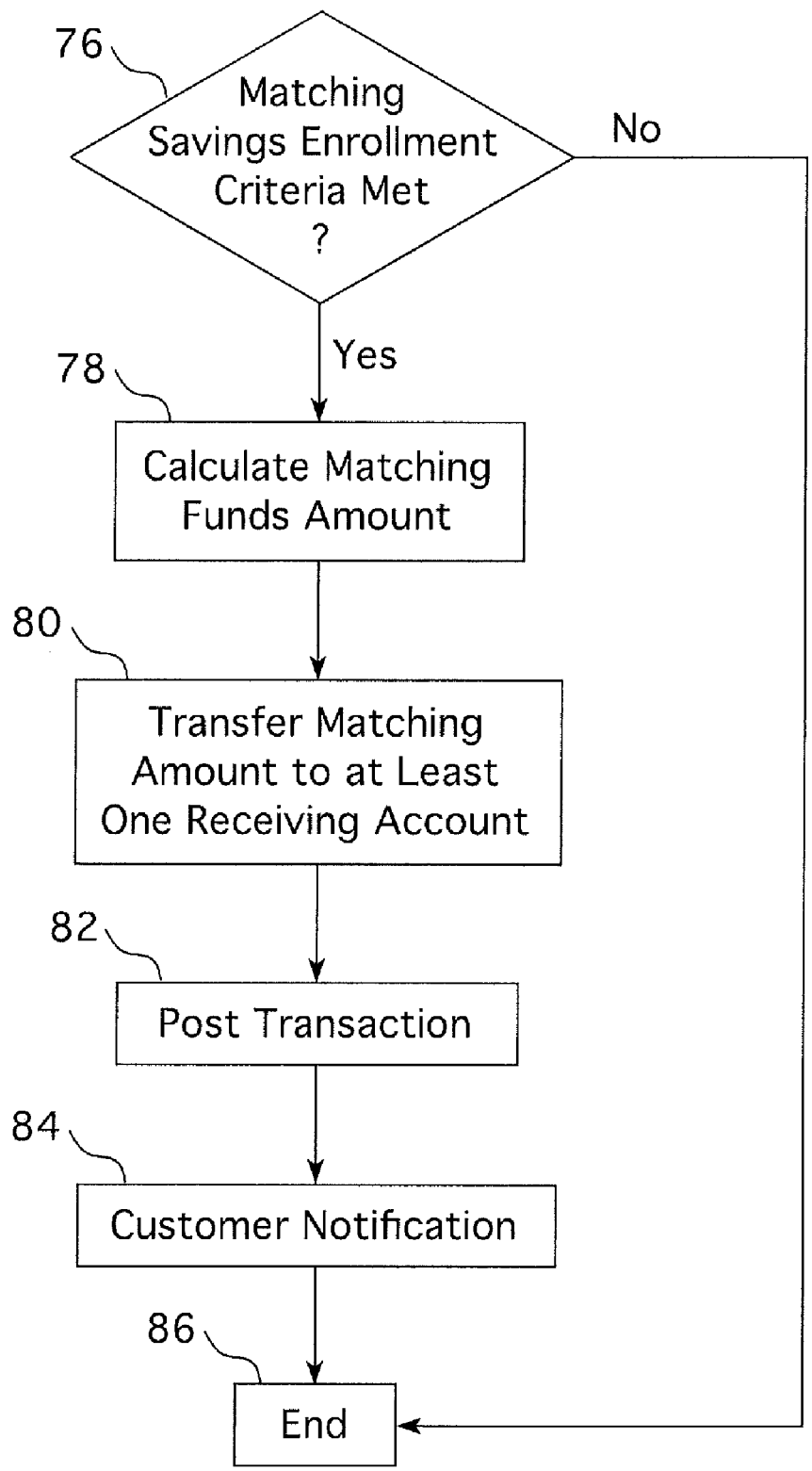
FIG. 7 illustrates a flowchart of an embodiment of a method for calculating and transferring matching funds for an automatic savings plan of the present invention.

FIG. 7 illustrates a flowchart of an embodiment of a method for calculating and transferring matching funds from a financial services entity for the automatic savings plan. In one embodiment, the financial services entity may match the savings amount. For example, the matched funds may be a percent of the aggregated savings amount or equal to the savings amount. After the aggregated savings amount is calculated for the specified time period, the matching savings enrollment criteria is checked at step 76. If the criteria are met, the matching funds are calculated at step 78. At step 80, the matching funds amount is transferred to at least one receiving account based on the designation for the savings amount and posted at step 82. In another embodiment, a message, for example an email or an SMS text message, is sent to the customer indicating the matching funds transfer at step 84. The process ends for the specified time period at 86.

Figure 8:
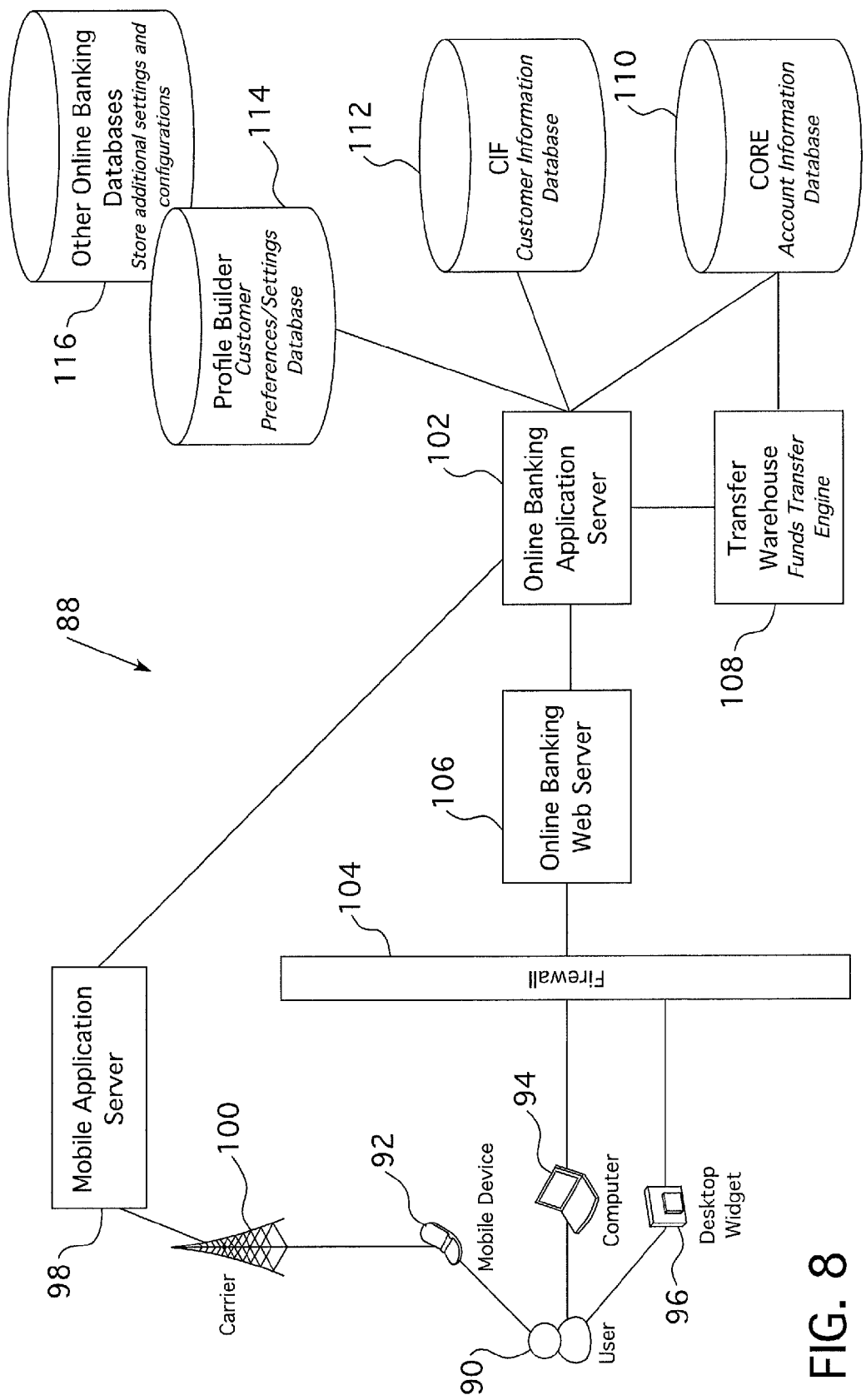
FIG. 8 illustrates an embodiment of a system in which embodiments of the present invention may be used.

FIG. 8 illustrates an embodiment of a system 88 in which embodiments of the present invention may be used. A user 90 utilizes a network-enabled client device with a display having a user interface, such as a mobile device 92, a computer 94, a desktop widget 96, or any other suitable device. The mobile device 92 accesses, via a mobile application server 98 and a wireless carrier 100, an online banking application server 102 (i.e., a host system of the account). The online banking application server 102 or a processor may perform some or all of the steps of the methods for determining a monetary amount based on the time stamps of a plurality of transactions occurring within the debit account over a specified period of time and transferring to at least one receiving account as described in various embodiments herein. The computer 94 and the desktop widget 96 access the online banking application server 102 via a firewall 104 protected online banking web server 106.

The online banking application server 102 is in communication with a transfer warehouse 108 (funds transfer engine), an account information database 110, a customer information database 112, a customer preferences/settings database 114, and other online banking databases 116 that store additional settings and configurations.

Various embodiments of the present invention may be implemented on computer-readable media. The terms "computer-readable medium" and "computer-readable media" in the plural as used herein may include, for example, magnetic and optical memory devices such as diskettes, compact discs of both read-only and writeable varieties, optical disk drives, hard disk drives, etc. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

What is claimed is:

1. A computer-assisted method for an automatic savings plan, the method comprising:
   calculating, using a computer, a savings amount from an indication of a time of transaction for each of a plurality of transactions, wherein calculating a savings amount includes one of:
   (a) multiplying one of a minute portion of the indication of time and an hour portion of the indication of time by a predetermined value to arrive at the savings amount;
   (b) equating the savings amount to one of a minute portion of the indication of time and an hour portion of the indication of time;
   (c) adding one of a minute portion of the indication of time and an hour portion of the indication of time to a predetermined value to arrive at the savings amount; and
   (d) adding a minute portion of the indication of time to an hour portion of the indication of time to arrive at the savings amount; and
   transferring the savings amount from a first account to at least one receiving account.

2. The method of claim 1, further comprising enrolling a customer in the automatic savings plan.

3. The method of claim 2, wherein enrolling the customer comprises:
   designating the first account;
   designating the at least one type of transaction;
   designating at least one receiving account; and
   designating a recurring specified time period for calculating.

4. The method of claim 3, wherein enrolling the customer further comprises assigning a designation for a transfer transaction of the savings plan between the first account and the receiving account.

5. The method of claim 3, wherein enrolling the customer further comprises accepting, by the customer, at least one of a term and a disclosure.

6. The method of claim 3, wherein enrolling the customer further comprises sending a customer confirmation.

7. The method of claim 3, wherein the receiving account is a folder within the first account.

8. The method of claim 3, wherein designating the at least one receiving account further comprises assigning a percentage of the savings amount to each receiving account.

9. The method of claim 1, further comprising processing the plurality of transactions.

10. The method of claim 9, wherein processing the plurality of transactions further comprises checking a savings plan enrollment.

11. The method of claim 9, wherein processing the transactions further comprises determining an amount of a transaction eligible for the savings plan.

12. The method of claim 1, further comprising ensuring sufficient funds are available in the first account prior to transferring.

13. The method of claim 1, further comprising deducting the savings amount from the first account at a specified time.

14. The method of claim 1, further comprising validating the at least one receiving account.

15. The method of claim 1, further comprising sending a notice to the customer if the at least one receiving account is invalid.

16. The method of claim 1, further comprising posting a savings plan transaction to the first account and the at least one receiving account.

17. The method of claim 1, further comprising transferring a matching funds amount to the at least one receiving account upon meeting a criterion of a matching savings plan, wherein the matching funds amount is calculated based on the savings amount.

18. A system for an automatic savings plan, the system comprising:
   a memory; and
   a processor in communication with the memory, wherein the processor is configured to:
      calculate a savings amount from an indication of a time of transaction for each of a plurality of transactions, wherein calculating a savings amount includes one of:
      (a) multiplying one of a minute portion of the indication of time and an hour portion of the indication of time by a predetermined value to arrive at the savings amount;
      (b) equating the savings amount to one of a minute portion of the indication of time and an hour portion of the indication of time;
      (c) adding one of a minute portion of the indication of time and an hour portion of the indication of time to a predetermined value to arrive at the savings amount; and
      (d) adding a minute portion of the indication of time to an hour portion of the indication of time to arrive at the savings amount; and
      transfer the savings amount from a first account to at least one receiving account.

19. The system of claim 18, wherein the processor is further configured to enroll a customer in the automatic savings plan.

20. The system of claim 19, wherein to enroll the customer, the processor is configured to:
   accept a designation of the first account;
   accept a designation of at least one type of transaction;
   accept a designation of the at least one receiving account; and
   accept a designation of a recurring specified time period to calculating.

21. The system of claim 20, wherein to enroll the customer, the processor is further configured to accept a designation of a transfer transaction of the savings plan between the first account and the receiving account.

22. The system of claim 20, wherein to enroll the customer, the processor is further configured to require the customer to accept at least one of a term and a disclosure.

23. The system of claim 20, wherein to enroll the customer, the processor is further configured to send a customer confirmation.

24. The system of claim 20, wherein the receiving account is a folder within the first account.

25. The system of claim 20, wherein to designate the at least one receiving account, the processor is further configured to assign a percentage of the savings amount to each receiving account.

26. The system of claim 18, wherein the processor is further configured to process the plurality of transactions.

27. The system of claim 26, wherein to process the plurality of transactions, the processor is further configured to check a savings plan enrollment.

28. The system of claim 26, wherein to process the transactions, the processor is further configured to determine an amount of a transaction eligible for the savings plan.

29. The system of claim 18, wherein the processor is further configured to ensure sufficient funds are available in the first account.

30. The system of claim 18, wherein the processor is further configured to deduct the savings amount from the first account at a specified time.

31. The system of claim 18, wherein the processor is further configured to validate the at least one receiving account.

32. The system of claim 18, wherein the processor is further configured to send a notice to the customer if the at least one receiving account is invalid.

33. The system of claim 18, wherein the processor is further configured to post a savings plan transaction to the first account and the at least one receiving account.

34. The system of claim 18, wherein the processor is further configured to transfer a matching funds amount to the at least one receiving account upon meeting a criterion of a matching savings plan, wherein the matching funds amount is calculated based on the savings amount.

35. An apparatus for an automatic savings plan, the apparatus comprising:
   means for calculating a savings amount from an indication of a time of transaction for each of a plurality of transactions, wherein calculating a savings amount includes one of:
   (a) multiplying one of a minute portion of the indication of time and an hour portion of the indication of time by a predetermined value to arrive at the savings amount;
   (b) equating the savings amount to one of a minute portion of the indication of time and an hour portion of the indication of time;
   (c) adding one of a minute portion of the indication of time and an hour portion of the indication of time to a predetermined value to arrive at the savings amount; and
   (d) adding a minute portion of the indication of time to an hour portion of the indication of time to arrive at the savings amount; and
   means for transferring savings amount from a first account to at least one receiving account.

36. A computer readable medium having stored therein instructions which, when executed by a processor, cause the processor to:
   calculate a savings amount from an indication of a time of transaction for each of a plurality of transactions, wherein calculating a savings amount includes one of:
   (a) multiplying one of a minute portion of the indication of time and an hour portion of the indication of time by a predetermined value to arrive at the savings amount;
   (b) equating the savings amount to one of a minute portion of the indication of time and an hour portion of the indication of time
   (c) adding one of a minute portion of the indication of time and an hour portion of the indication of time to a predetermined value to arrive at the savings amount; and
   (d) adding a minute portion of the indication of time to an hour portion of the indication of time to arrive at the savings amount; and
   transfer the savings amount from the first account to at least one receiving account.

* * * * *